G. SEIBT.
ELECTRIC PLATE CONDENSER.
APPLICATION FILED OCT. 17, 1911.
1,155,448.
Patented Oct. 5, 1915.
2 SHEETS—SHEET 1.
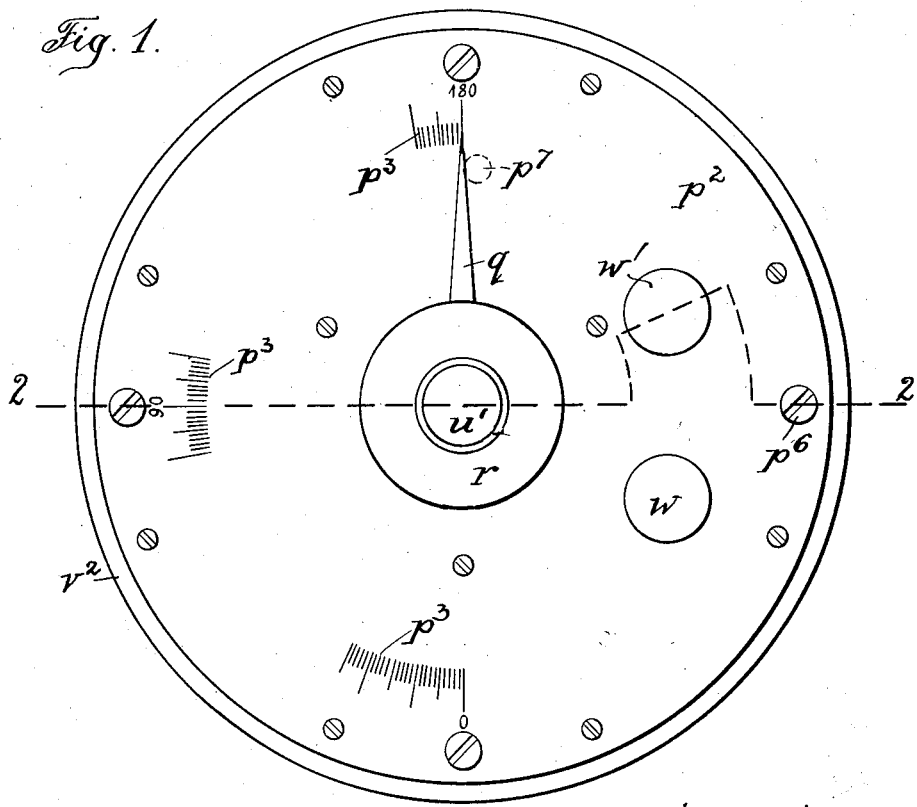
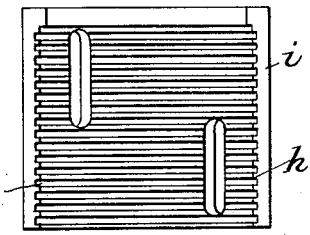
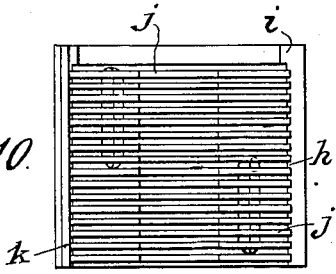
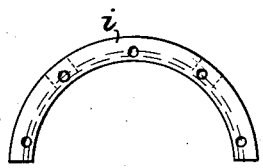
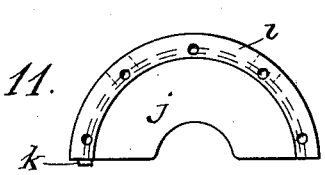
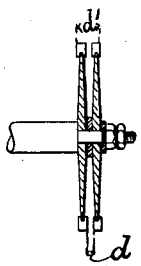
WITNESSES:
Charles Mathé
Chas. A. Willett.
INVENTOR
Georg Seibt
BY
John Lotka
ATTORNEY

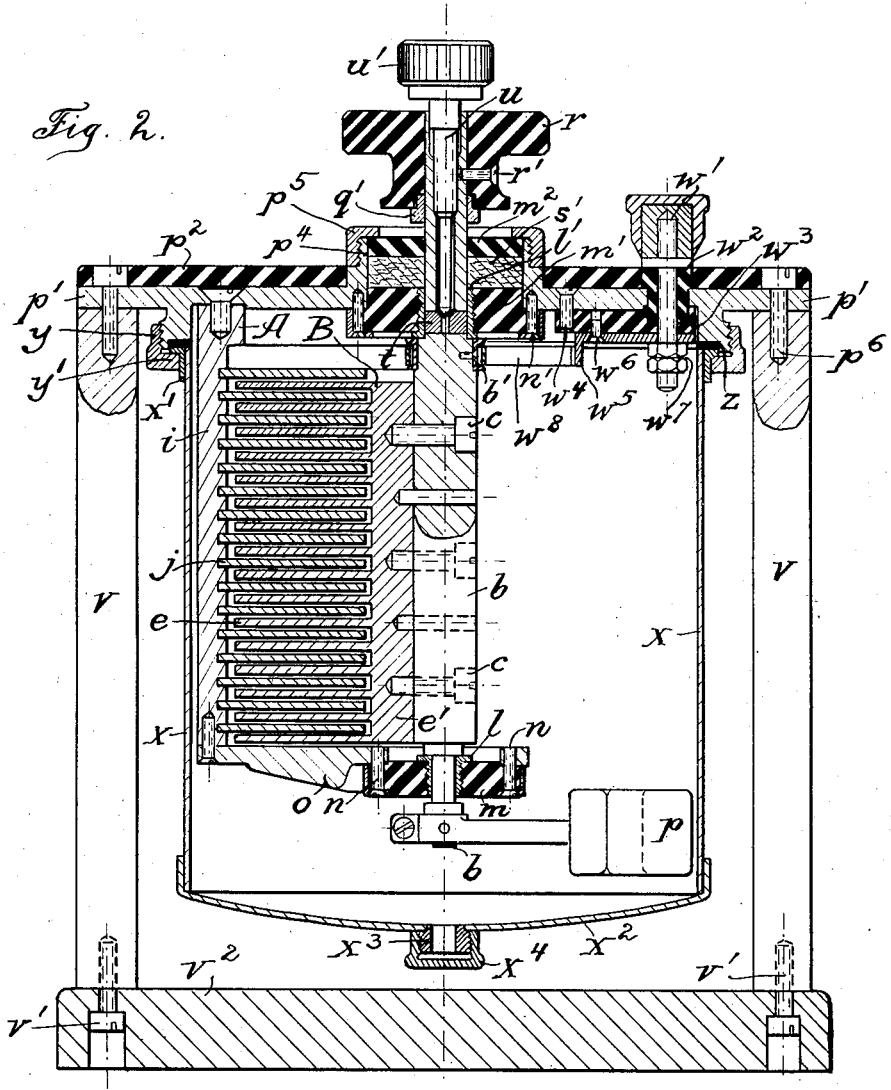

UNITED STATES PATENT OFFICE.

GEORG SEIBT, OF SCHÖNEBERG, NEAR BERLIN, GERMANY, ASSIGNOR TO GENERAL TRANSMISSION COMPANY, OF NEW YORK, N. Y., A CORPORATION OF NEW JERSEY.

ELECTRIC PLATE-CONDENSER.

1,155,448.     Specification of Letters Patent.     Patented Oct. 5, 1915.

Application filed October 17, 1911. Serial No. 655,210.

*To all whom it may concern:*

Be it known that I, GEORG SEIBT, a subject of the German Emperor, and resident of Schöneberg, near Berlin, Germany, have invented certain new and useful Improvements in Electric Plate - Condensers, of which the following is a specification.

My present invention relates to electric plate condensers, and particularly to variable capacity electric condensers of the type designed by Köpsel. Condensers of this type, which are widely used, especially in wireless telegraphy, comprise two sets of parallel semicircular plates, one set being stationary and the other mounted to turn so as to bring the plates of the movable set, to a greater or smaller extent, between the plates of the stationary set, thereby varying the capacity of the apparatus.

In the practical use of condensers of this type, as made hitherto, considerable difficulty has been experienced in obtaining a uniform efficiency under different atmospheric conditions, particularly as it proved necessary to employ a large amount of time and skill in order to obtain perfectly plane plates of even thickness and even spacing. Furthermore, the apparatus was of comparatively large dimensions.

By means of my invention, more fully described hereinafter, I have been enabled to reduce considerably the size of a condenser of a given capacity and to insure a permanently efficient operation of the apparatus.

The invention will now be described in detail with reference to the accompanying drawings, in which—

Figure 1 is a top view of the apparatus; Fig. 2 is a central vertical section on line 2—2 of Fig. 1; Fig. 3 an elevation and Fig. 4 a top view of the blank from which the movable member or electrode of the condenser is made; Fig. 5 is a face view and Fig. 6 a top view of the finished movable member (without its shaft or spindle).; Fig. 7 is a sectional view of the cutter employed for milling out the spaces of the condenser members; Figs. 8 and 9 are a face view and a top view respectively showing a portion of the stationary condenser member or electrode at an intermediate stage of its manufacture; and Figs. 10 and 11 are similar views of the completed stationary member.

For making the inner or movable member of the condenser, the following procedure has been devised after considerable experimenting: I start with two blanks of the shape shown in Figs. 3 and 4 and of suitable material, such as magnalium or aluminium. Each of these blanks has the form of a solid half cylinder with faces $f$, which are made perfectly plane by means of cutters or other suitable tools, and with axial projections or studs $s$ at opposite ends. The two blanks are fitted against each other with the plane surfaces $f$ and held in this position by means of a clamping ring surrounding the two blanks. The composite cylindrical body thus formed is placed in a lathe and the studs $s$ are turned to a conical shape. Suitable fitting or collars are then applied to the ends or studs $s$ so as to enable the clamping ring to be removed and yet hold the two blanks together. The body with its fittings is then placed in the lathe and the cylindrical surface turned down to the proper diameter. Then by means of a chisel I cut into the periphery shallow grooves which should be somewhat narrower than the intended distance between the finished plates $e$. The cylindrical body is then fitted into a suitable socket to hold it together, the fittings previously applied to the studs $s$ are removed, the studs chiseled off, and the body is drilled through axially. The socket having been removed, the two blanks fall apart, and each of them receives in its axial groove $a$, a shaft or spindle $b$ secured to the blank by means of screws $c$.

It will be understood, of course, that the two blanks are used in the assembling of two condensers.

The next operation consists in working the grooves or intervals to the proper width and depth, with such accuracy that the material remaining between the cuts will form absolutely plane and parallel plates spaced with perfect uniformity. For this purpose I employ a lathe having a very accurate micrometer scale in connection with the adjusting spindle of the slide rest. On this slide rest I provide a bracket with two bearings, parallel to the lathe spindle, and in these bearings I mount a double milling cutter of the shape shown in Fig. 7. The teeth of the cutter should be backed off considerably, to prevent the plates from yielding laterally. The distance $d$ equals the desired thickness of the plates, and the distance $d'$ should be such that the side faces of the cutter disks will not rub against the plates. While the work is being rotated by the lathe, the double cutter is also rotated in any suitable manner, as by means of a driving belt, or by hand.

The micrometer adjustment insures a perfectly regular spacing of adjacent plates. If the tool is accurate and the scale reliable, the variations will be but small fractions of a tenth of a millimeter.

The manufacture of the stationary outer member has been carried out successfully by either one of the following two methods: the first method is very similar to that described above for the manufacture of the inner, movable member. The blank in this case is a half cylinder of a larger diameter than the blank employed for the movable member. This blank is turned so that its circumference will be part of a true cylinder, in the same manner as described above, and formed with an axial groove of a sufficient diameter to receive the central portion or core $e'$ of the movable member. Then, instead of employing a chisel to groove the stationary member, I clamp the latter securely on a support or table, start the grooves on the inner periphery of the member with a preliminary milling cutter, and finish these grooves to the accurate dimensions desired, by means of the milling cutter shown in Fig. 7.

The second method is as follows: a hollow cylindrical body is first trued on its inner and outer surfaces, and by means of a turning chisel or other suitable tool annular grooves $g$ of a few millimeters depth are cut in the inner surface, as shown in Fig. 8, so as to form ridges $h$ which constitute distance pieces, and a body $i$ forming a carrier. The grooves $g$ are spaced evenly, by the aid of a micrometer adjustment for the chisel. The hollow cylinder is then cut into two half-cylinders (or if it was formed of two half-cylinders soldered together for the truing and grooving operations, they are unsoldered). The segmental plates $j$, produced separately in any suitable manner, are then slipped into the grooves $g$ and secured by riveting at their ends, by soldering, or by means of a retaining strip $k$ (Figs. 10 and 11) or in any other approved manner. The plates, being of a relatively small diameter (say 9 centimeters for a condenser having a normal capacity of 2000 centimeters) and relatively thick (say 2 millimeters), are not liable to warp, so that they will always remain evenly spaced.

When produced according to the first method, the stationary member, like the movable member, may be said to comprise as integral and rigidly connected parts, the following three elements: 1, the parallel plates; 2, distance pieces for spacing the plates evenly; and 3, a carrier for said plates and distance pieces. When produced according to the second method, the stationary member may be said to comprise as integral parts, 1, the carrier $i$ and 2, the distance pieces $h$, the plates $j$ in this case not being integral with the carrier and the distance pieces.

The plates, both of the movable member and of the stationary member, were made about 2 millimeters thick in a condenser having a normal capacity of 2000 centimeters, and the width of the air gaps remaining between a plate of one member and the adjacent plates of the other member, was only about from .25 to .3 of a millimeter, that is to say, considerably less than what has been found necessary in practice prior to my invention, when air gaps were generally given a width of about 1.25 of a millimeter (50/1000ths of an inch). With sixteen plates in each set, I obtained the same capacity which hitherto was formed by a Köpsel condenser with twenty-four plates to each set, a plate thickness of 1 millimeter, and an external diameter of 15 centimeters against 9 centimeters in my case. The greater thickness and smaller diameter of the plates employed by me give them much greater rigidity, so that warping of the plates or deflection by jarring, and resulting contact, are avoided efficiently. Since the carrier and the distance pieces form an integral body (and the plates also, in two of my constructions described above), the spacing of the plates is absolutely invariable. The particular method of insuring an even spacing of the plates also insures absolute uniformity of the air gap, so that an efficient condenser is obtained notwithstanding its relatively small dimensions. The fact that the plates, the distance pieces, and the carrier, or at least two of these three elements, are formed or machined from the same piece of metal insures an invariable position of the plates relatively to each other and avoids the drawbacks resulting from a relative shifting of the plates.

The two condenser members made in the manner described above, are assembled to form a condenser structure, for instance according to Figs. 1 and 2. The lower portion of the spindle $b$ is journaled in a metal bushing $l$ fitted into an insulating collar $m$, preferably made of Bakelite, which is secured by means of screws $n$ to a stationary bottom plate $o$ secured rigidly to the carrier portion $i$ of the stationary condenser member A. To the lower end of the spindle $b$ is secured a segmental counterweight $p$, on the side opposite to the movable condenser member B, so as to balance the same. This counterweight is arranged to swing in a plane below the bottom plate $o$, so that the latter will not restrict the movement of the condenser member B. The upper portion of the spindle $b$ is journaled in metal bushing $l'$ fitted into an insulating (Bakelite) collar $m'$ which is secured by means of screws $n'$ to the cover $p'$ secured rigidly to the carried portion $i$ of the stationary condenser member A. On the (metal) cover $p'$ I place a hard rubber plate $p^2$ provided with a graduation $p^3$ on which is adapted to indicate the pointer $q$ secured rigidly to the spindle $b$. For this purpose, the pointer is formed at one end with a sleeve $q'$ surrounding the spindle $b$ and screwed into a hard rubber knob $r$ which is held rigidly on the spindle $b$ by means of a set screw $r'$. The cover $p'$ has a threaded projection or stuffing box $p^4$ on which screws a cap $p^5$ arranged to press against an insulating (Bakelite) collar $m^2$ which is separated from the collar $m'$ by a compressible packing or washer $s'$.

In order to lock the movable member B after it has been adjusted by turning the knob $r$, the following arrangement is provided: The upper end of the spindle $b$ is made with an axial bore at the lower end of which is a transverse through aperture in which are located two small steel blocks $t$ adapted to be shifted outward and to be pressed against the bushing $l'$ so firmly as to lock the spindle against rotation. This is accomplished by the wedge-shaped lower end of the pin $u$ which engages both blocks $t$, said pin screwing into the axial bore of the spindle and being provided with a hard rubber head $u'$ for turning it.

The dial plate $p^2$ is secured to the cover $p'$ by means of screws $p^6$ which extend into posts $v$ the lower ends of which are secured by screws $v'$ to a base plate $v^2$.

The electrical connections to the condenser members are made in any suitable manner. The binding post $w$ for the stationary member A is simply secured to the cover $p'$, in metallic contact therewith. The binding post $w'$ for the movable member B is fitted into an insulating sleeve $w^2$ extending through the plate $p^2$ and cover $p'$, also through an insulating plate $w^3$ secured to the cover $p'$ by screws $w^4$, and through a conducting strip $w^5$ secured to the plate $w^3$ by a short screw $w^6$ and by one of the nuts $w^7$ on the lower end of the binding post $w'$. The binding post $w'$ and the conducting strip $w^5$ are thus insulated from the stationary member of the apparatus. To the flange at the inner end of the strip $w^5$ is secured the outer end of a spring $w^8$ (preferably made of silver) coiled around a sleeve $b'$ secured to the spindle $b$ the inner end of the spring being secured to said sleeve. The movable member B thus remains in electrical connection with the binding post $w'$ notwithstanding any movement of said member about the axis $b$. A stop $p^7$ may be provided on the inside of the cover $p'$ to limit the swinging movement of the member B.

In order to prevent the entrance of dust and moisture, the two condenser members are inclosed in a metal casing comprising a cylindrical body $x$ with a flange $x'$ at the upper end, and a dished bottom $x^2$ provided at its center with a perforated plug $x^3$ normally closed by a screw cap $x^4$. A clamping collar $y$ screwing on the cover $p'$ has a flange $y'$ adapted to press the flange $x'$ upward against a washer $z$ engaging the cover $p'$. This, in connection with the stuffing box $p^4$ (packing $s'$) through which the spindle $b$ extends, efficiently seals the working parts of the condenser against the entrance of moisture or dust.

For the purpose of securing a more gradual change of capacity as the movable member B enters into the spaces between the plates $j$ of the stationary member A, the plates $e$ of the movable member may be beveled off stepwise as indicated in Fig. 6, so that such plates, being thus of different extent circumferentially, will enter successively between the plates $j$ of the stationary member.

It will be observed that in the manufacture of the condenser members as described herein, the cutting of the slits into the solid body, to form plates between the slits, is carried out in a plurality of stages, a preliminary operation serving to locate or roughly prepare the grooves or slits while a final or finishing operation gives them the exact dimensions desired. Also the cutting operation as described progresses from one end of the body to the other, the milling cutters operating successively at different portions of the body. A very important advantage is due to the cutting of at least two slits at a time, since by such procedure I avoid all bending strains on the plate remaining between the two disks of the cutter, each disk backing or bracing such plate against the bending action exerted by the other disk.

Various modifications may be made without departing from the nature of my invention as set forth in the appended claims.

I claim:

1. In an electric condenser of the type having parallel plates, a condenser member comprising parallel plates, and a carrier for said plates, said carrier and plates being integral with one another and machined from a single metallic body.

2. In an electric condenser of the type having stationary parallel plates and movable parallel plates adapted to enter between the stationary plates, a movable condenser member comprising a carrying core, parallel plates forming an integral homogeneous body with said core, and a spindle secured to said core.

3. In an electric condenser of the type having stationary parallel plates and movable parallel plates adapted to enter between the stationary plates, a movable condenser member comprising a carrier and parallel plates forming an integral homogeneous body with said carrier, and a stationary condenser member having a metal body which comprises as integral parts, a plate carrier and distance pieces, and separate plates set between the distance pieces of said body.

4. In an electric condenser of the type having parallel plates, a condenser member or electrode comprising a series of parallel plates and a carrier for said plates, the material constituting said plates and carrier being formed as a single body.

5. An electric condenser comprising stationary parallel plates and movable parallel plates adapted to enter between the stationary plates, the edges of the movable plates being arranged in step-like fashion to secure a more gradual change of capacity.

6. An electric condenser comprising a base plate, posts rising therefrom, a cover, a stationary condenser member depending from said cover to within a distance from the base plate and provided with parallel plates, a movable member journaled tightly in the cover and provided with parallel plates adapted to enter between those of the stationary member, and a casing depending from the cover and inclosing said stationary member and movable member, the bottom of said casing extending between the base plate and the lower ends of said members.

7. An electric condenser comprising a support, a stationary member secured thereto and provided with parallel plates, a movable member provided with plates adapted to enter between those of the stationary member and with a spindle journaled in said support, said spindle having an axial bore and a transverse opening, a block movable outwardly in said opening to engage the support and lock the spindle, and an operating pin movable lengthwise in the bore of the spindle to engage the locking block and force it outwardly.

8. An electric condenser comprising a support, a stationary member secured thereto and provided with parallel plates, a movable member provided with plates adapted to enter between those of the stationary member and with a spindle journaled in said support, a binding post connected with the stationary member, another binding post carried by said support but insulated therefrom, and a spring coiled around said spindle, the inner end of the spring being secured to the spindle, while the outer end of the spring is in conducting connection with the second named binding post.

9. An electric condenser comprising stationary parallel plates and movable parallel plates adapted to enter between the stationary plates, the edges of the plates of one set being arranged in step-like fashion to secure a more gradual change of capacity.

10. An electric condenser comprising two sets of parallel plates having relative mobility and adapted to overlap more or less, the edges of the plates of one set being arranged in step-like fashion to secure a more gradual change of capacity.

In testimony whereof I have signed this specification in the presence of two subscribing witnesses.

GEORG SEIBT.

Witnesses:
  JOHN LOTKA,
  CHARLES MATHÉ.